United States Patent [19]
Critchlow et al.

[11] 3,820,667
[45] June 28, 1974

[54] ARTICLE HANDLING MACHINE

[75] Inventors: Arthur J. Critchlow; Charles J. Bryson, both of San Jose, Calif.

[73] Assignee: Materials Management Systems, Inc., San Jose, Calif.

[22] Filed: Dec. 12, 1972

[21] Appl. No.: 314,453

[52] U.S. Cl............. 214/1 BT, 214/16.4 A, 214/514, 214/650 SG
[51] Int. Cl................................................. B66c 9/18
[58] Field of Search............ 214/650 SG, 514, 1 BT, 214/16.4 A, 730

[56] References Cited
UNITED STATES PATENTS
2,708,046  5/1955  Cushman..................... 214/650 SG
3,549,025  12/1970  Messner........................ 214/16.4 A

*Primary Examiner*—Robert J. Spar
*Assistant Examiner*—George F. Abraham
*Attorney, Agent, or Firm*—Flehr, Hohbach, Test, Albritton & Herbert

[57] ABSTRACT

An article handling machine incorporating the combination of an elongate, rigid tine member, means for moving the tine member to a position adjacent one of the articles to be stacked or otherwise moved and a movable picker arm carrying suction means at the outer end thereof to engage a cardboard case or other article to be moved. Means are provided for advancing the picker arm and suction means from a retracted to an advanced position to dispose the suction means into confronting engagement with the article. Means for adhering the suction means to the article includes a vacuum source for adhering the suction means to the article in an upwardly disposed shear plane at the interface defined therebetween. Means for lifting the suction means so as to also lift the article via the shear plane are provided as well as means for relatively moving the picker arm with respect to the tine member so as to dispose the article at least partly onto the tine member whereby the tine member can then be moved to carry the article to a desired location. Means for straightening the article as it is drawn along the tine member are provided as well as means for insuring that the article is lifted before it is moved.

11 Claims, 16 Drawing Figures

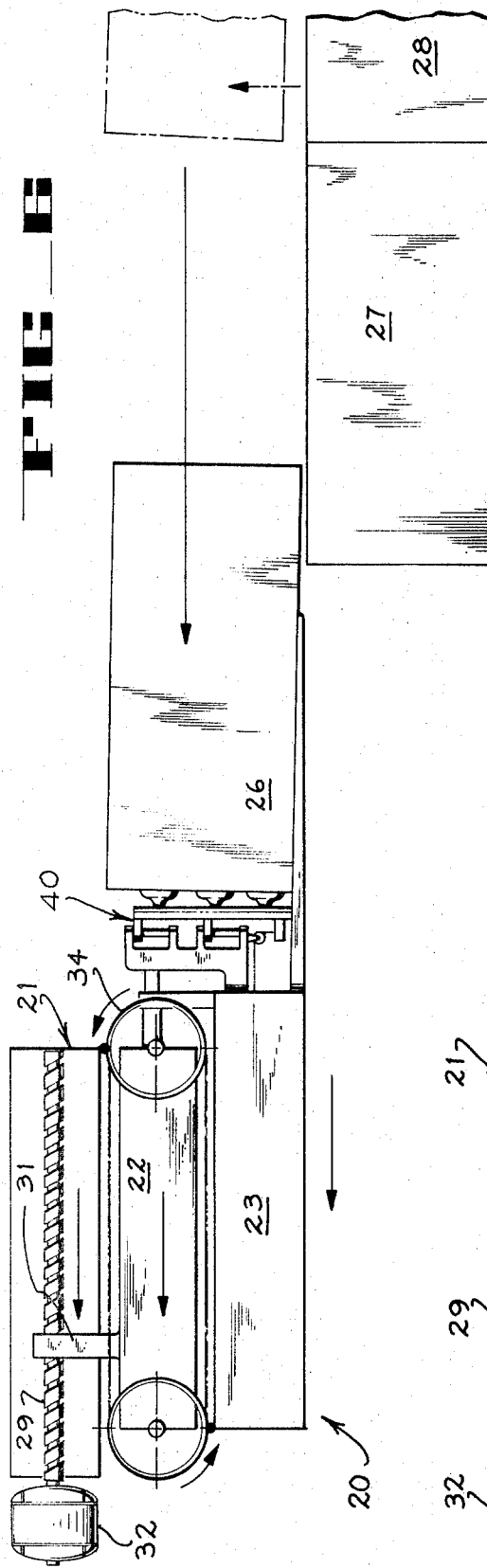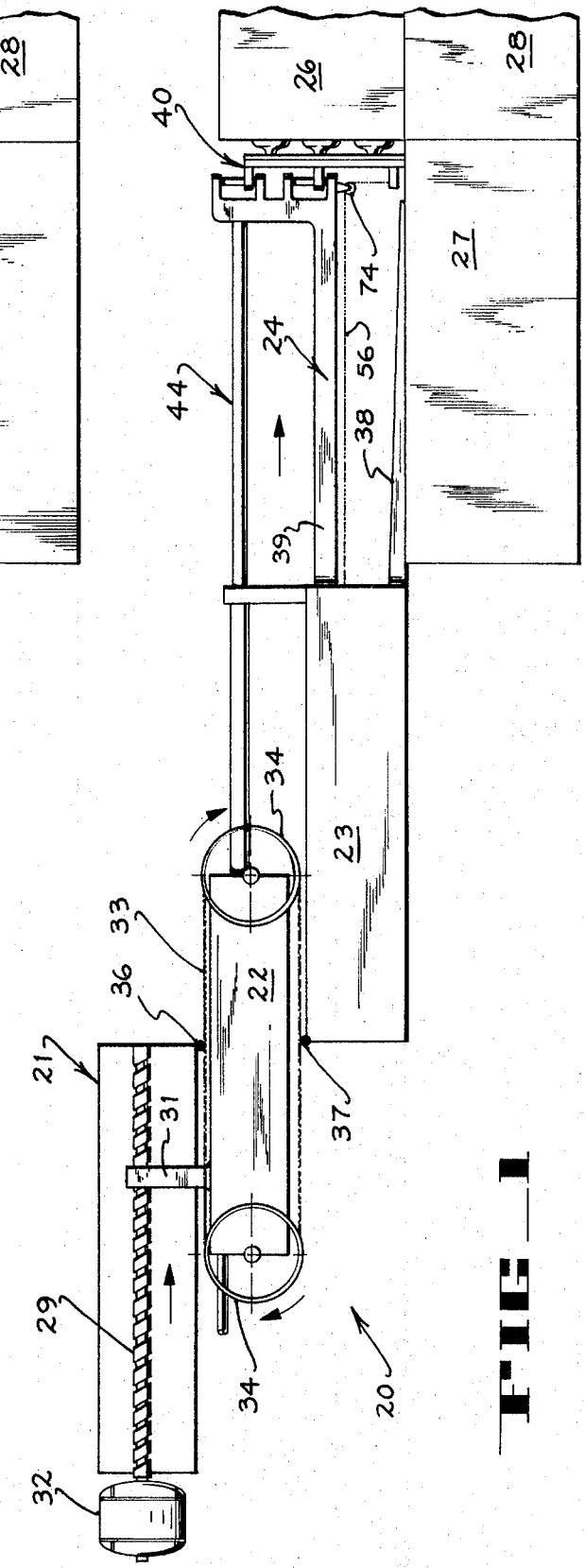

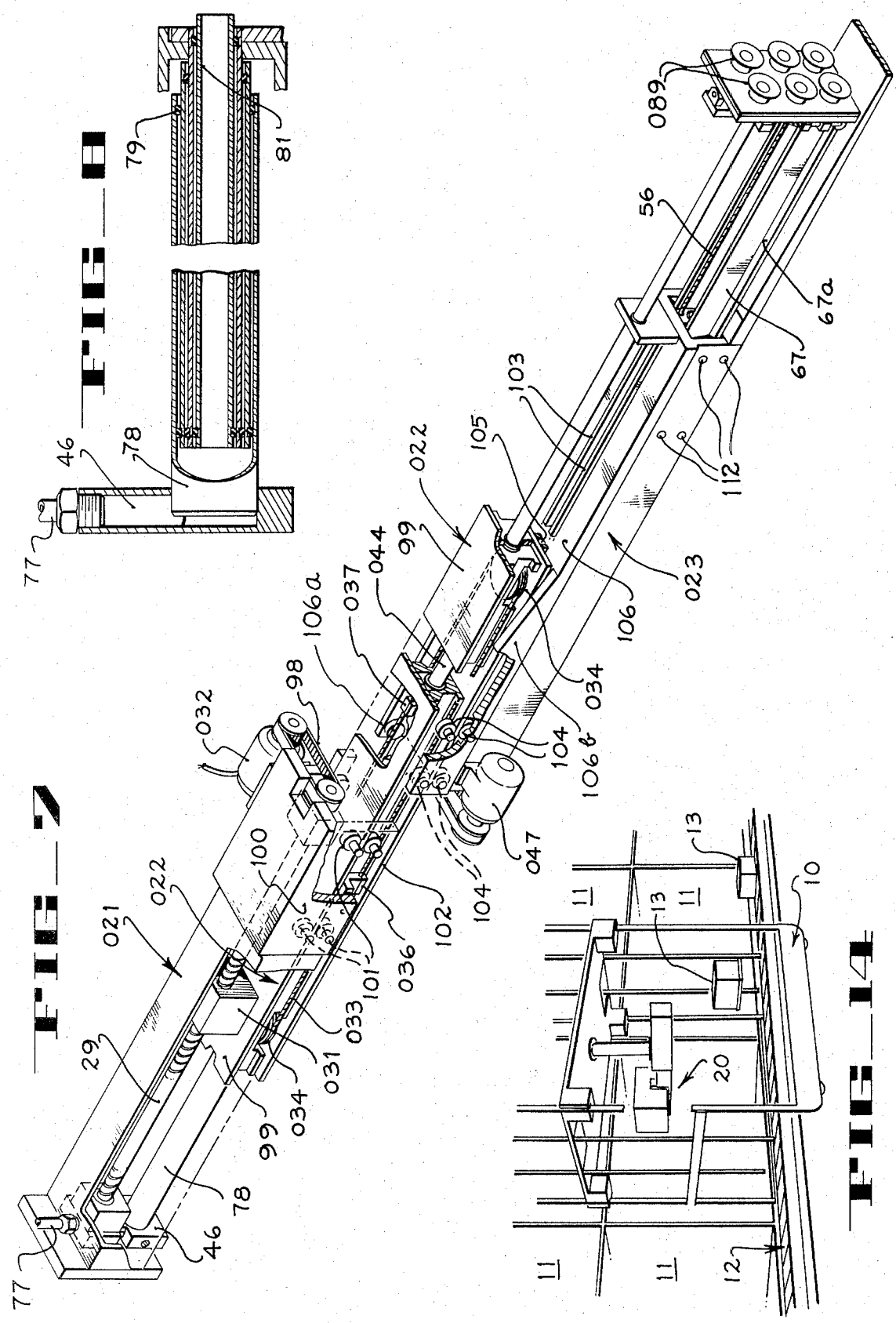

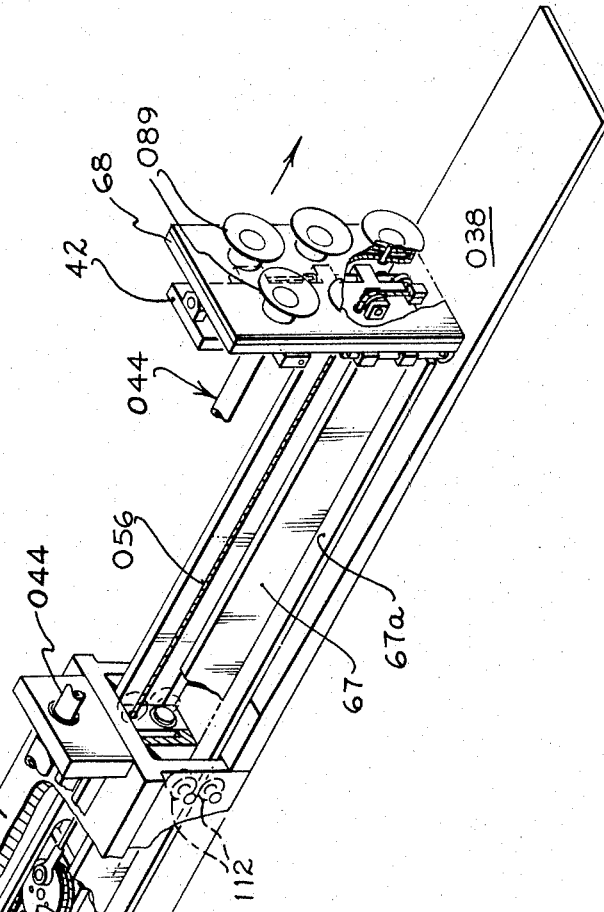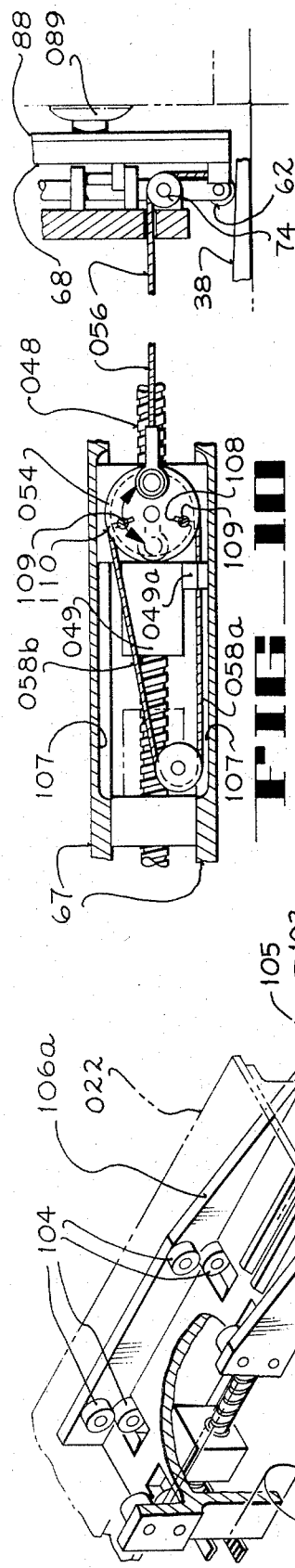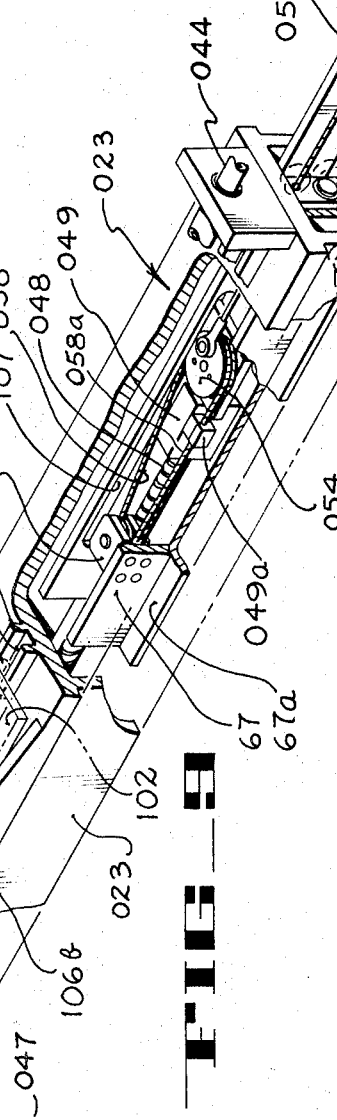

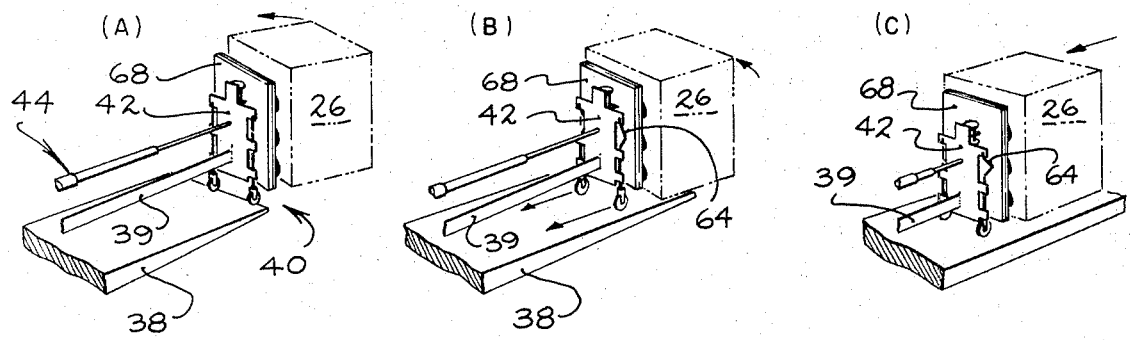
FIG_13
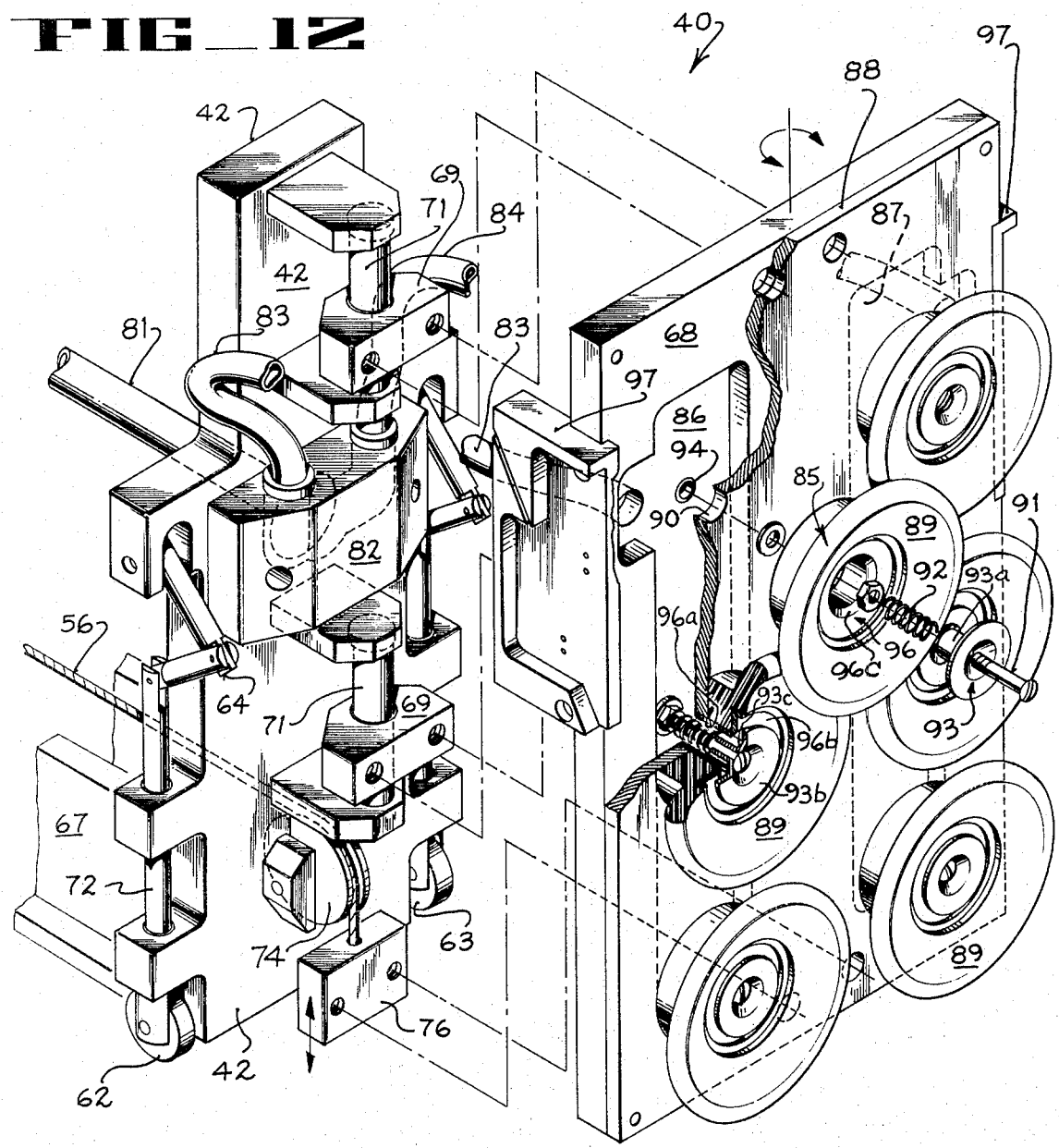
FIG_12

ARTICLE HANDLING MACHINE

BACKGROUND OF THE INVENTION

This invention pertains to an article handling machine of a type particularly useful, for example, in handling cases of commodities as in warehousing and other storage and retrieval circumstances.

So-called stacking machines of the type for automatically locating and retrieving articles from storage are known and presently under development. One particular problem has existed with respect to the handling of cardboard cases of commodities such as canned goods, fresh produce, and the like wherein the bottom of the box includes the usual pair of transversely extending flaps which, when weakened, wet, or overloaded, can tend to sag and hang downwardly below the bottom of the case. Prior attempts to automate the handling of cases have been hampered by this problem. For example, where the cases are stacked upon a conventional pallet, the boards of the pallet are spaced apart so that any downwardly hanging or sagging flap on the bottom of the bottommost cases can become caught so as to resist sliding movement of the cases from the pallet. Also, where the cases are located upon other cases, such a downwardly sagging bottom flap makes it difficult to slide a case across the tops of the other cases without catching.

Vacuum pickup devcies have also been used in the past which pick up a case by applying a vacuum to the top of the case. Many times the top flaps of a case have become loosened or unglued, allowing the case to drop and damage the contents. Other times the bottom flaps give way when the case is accelerated vertically and drop the case's contents. This invention mechanically supports the bottom flaps of the case during acceleration and movement to prevent loss of the contents. This invention also lifts, by engaging a side of the case which is normally stronger than the top flaps of the case, and thus less subject to pulling loose and releasing the case or its contents.

Where cases are stacked upon a pallet, they are usually oriented to form an alternately layered cube. Occasionally one of the cases may become cocked at an angle with regard to the other cases to make retrieval of such a case somewhat difficult using equipment of known style.

Accordingly, it has been desirable to provide an improved means for retrieval of cases and other articles from storage which overcomes the foregoing and other problems.

SUMMARY OF THE INVENTION AND OBJECTS

In general, there has been provided herein a machine for handling articles comprising the combination of an elongate, rigid tine member, means such as a mobile crane or other device for moving the time member to a position adjacent one of the articles time be retrieved from storage or otherwise obtained, and a movable picker arm which is arranged to move between advanced and retracted positions relative to the tine member. The picker arm carries a suction means at one end to be disposed in confronting engagement with an article or case to be retrieved. Means for adhering the suction means to the article in an upwardly disposed shear plane at the interface defined between the suction means and the case or article provides substantially the only attachment between the picker arm and the article to be retrieved. Means for lifting the suction means are provided so as to lift the article via the shear plane formed therewith and then the article is moved or handled by means which serves to move the arm relative to the tine member so as to dispose the article at least partly onto the tine member whereby the tine member can then be used for transporting the article.

In general, it is an object of the present invention to provide an improved materials handling sub-system of a type as can be carried upon suitable transport means.

It is another object of the present invention to provide a machine for handling articles of the kind described and others by means of an upstanding shear plane defined between suCtion means and the article itself.

A further object of the invention is to provide an improved machine for handling articles in which the adherent suction means is readily pivotable in order to accommodate cases or articles which are otherwise cocked at an angle to the direction of movement of the suction means.

It is yet another object of the invention to provide a machine of the type described characterized by simplified, low-cost means for extending a suction assembly into confronting adhering engagement with a case to be handled.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic side elevation view of an article handling machine arm assembly according to the invention and with portions removed for clarity;

FIG. 6 shows the apparatus of FIG. 1 in its retracted condition in diagrammatic form;

FIG. 7 shows a diagrammatic perspective view with portions broken away for clarity of a picking arm assembly according to the invention;

FIG. 8 shows, in section, the telescopically collapsed vacuum manifold and feed column in detail according to the invention;

FIG. 9 shows an enlarged detail, exploded, perspective diagrammatic view with portions broken away showing the right hand portions of FIG. 7 in enlarged detail;

FIG. 10 shows an enlarged detail plan view of FIG. 9;

FIG. 11 shows an enlarged side elevation detail view of FIG. 9;

FIG. 12 shows an exploded, enlarged, diagrammatic, perspective view of a vacuum head assembly according to the invention;

FIGS. 13A, B and C respectively show each of a sequence of steps carried out by the apparatus in straightening or squaring a case being handled by the apparatus from a cocked position;

FIG. 14 shows a diagrammatic perspective view of an application incorporating the article handling arm assembly according to the invention.

DETAILED DESCRIPTION OF A PREFERRED EMBODIMENT

Figure 3:
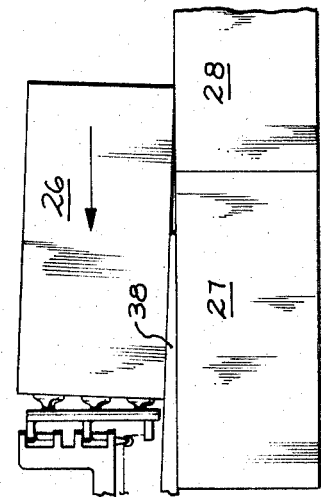
FIGS. 3, 4 and 5 are diagrammatic views showing a portion of the apparatus carrying out steps of the method of handling a case or other article according to the invention.

An extensible article handling arm assembly 20 is shown in a typical environment in FIG. 14 where the arm assembly 20 may, for example, be carried by a rolling support vehicle 10. Vehicle 10 can be positioned in front of any one of a number of predetermined storage bins 11 or warehouse locations as a conveyor assembly 12 carries cases 13 of goods thereon into a position to be transferred into or out of a selected storage bin 11.

As best illustrated by the diagrams shown in FIGS. 1–6, an arm assembly 20 is shown in FIG. 1 in its extended position and in FIG. 6 in its fully retracted position. Briefly, arm assembly 20 comprises a plurality of four sections 21, 22, 23, 24. After arm assembly 20 has been oriented in the direction of a case or article to be retrieved, such as one of the cases 26, 27, 28, as loaded, for example, on a pallet (not shown), arm section 21 remains thereafter substantially stationary. Arm section 21 includes an elongate ball screw 29 and a ball nut 31 which moves along the length of ball screw 29 between advanced and retracted positions as determined by the direction of rotation of the drive motor 32.

Section 22 includes a cyclic belt, cable or chain 33 trained about a pair of pulleys 34 mounted for rotation with respect to the main body of section 22. As shown in FIG. 1, attachment of section 21 and belt 33 is made at point 36 while attachment of section 23 to belt 33 is made at point 37.

Figure 2:
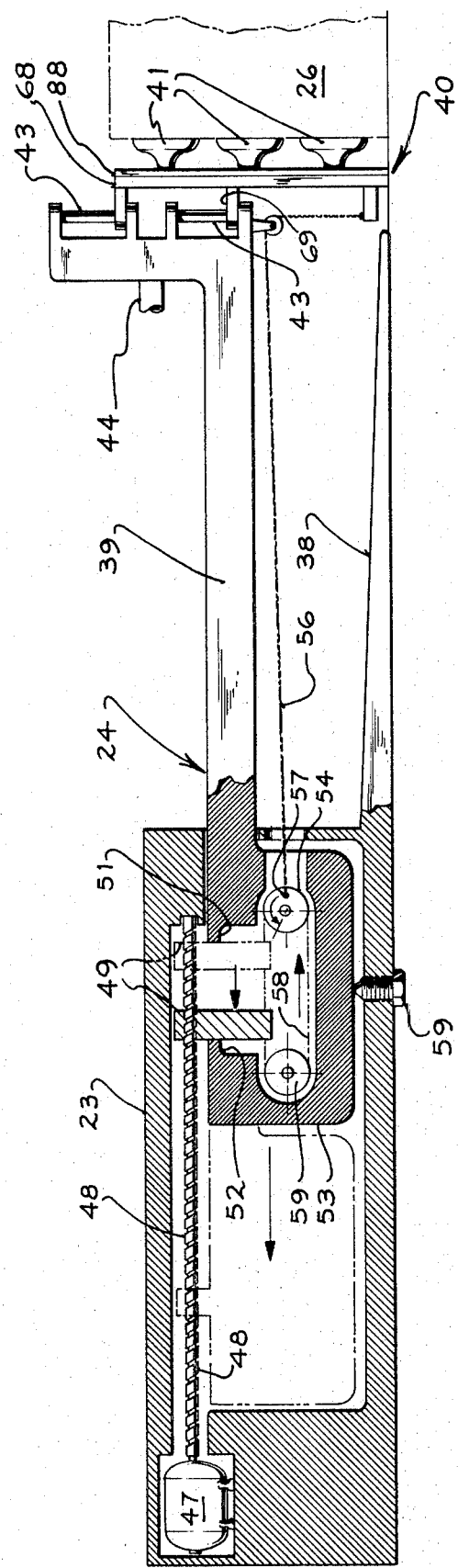
FIG. 2 shows a side elevation diagrammatic view partly in section and with portions removed for clarity.

Section 23 carries an elongate, rigid "shovel" or tine member 38 therewith and contains therein means constituting section 24 as shown best in FIG. 2. Section 24 includes, in general, an elongate picker arm 39 for supporting an array of suction cups disposed upon a mounting plate 68 or support body which, in turn, is carried by a pair of hinged couplings 43 mounted to the end of arm 39. Couplings 43 permit mounting plate 68 to move between lifted and lowered positions as well as to pivot laterally from side to side.

Means forming a telescopically extensible vacuum flow column 44 extends from section 21 via section 22 to couple the vacuum head assembly 40 to a source of vacuum (not shown) via a manifold 46 (FIGS. 7 and 8).

Section 23 is coupled to drive section 24 by means of the drive motor 47, ball screw 48 and ball nut 49. Ball nut 49 moves between forward and rear limit stop portions 51, 52 of the carriage body 53 formed on the inner end of arm 39 (FIG. 2).

Carriage body 53 includes a 120° crank element 54 for raising and lowering vacuum head assembly 40 by means of the cable 56 coupled at one end to assembly 40 and at the other end to a pin 57 forming crank element 54.

Accordingly, a cyclic belt 58 is trained about crank element 54 and also about a pulley 59. The upper (as shown in FIG. 10) reach of belt 58 is fixed or made fast to ball nut 49 so as to travel therewith. The spacing between limits stops 51, 52 serves to define the degree of rotation of crank element 54 and in the present instance it has been observed to be advantageous to limit that rotation to something on the order of 120°. This amount of rotation, together with an appropriate radius of crank element 54, serves to lift a case or box high enough that it can be dragged from a pallet even while a bottom flap may sag beneath.

Finally, a readily releasable detent 59 engages a detent opening or dimple formed in the bottom of carriage body 53 for purposes as will be readily appreciated with the following explanation.

Operation of arm assembly 20 to retrieve a case such as case 26 from storage requires only that arm assembly 20 be moved by suitable means, as shown, for example in FIG. 14, to a position adjacent case 26. At that point, drive motor 32 is operated so as to extend assembly 20 to the position shown in FIG. 1 wherein tine member 38 is disposed closely adjacent case 26 whereby vacuum assembly 40 may be advanced independently of the drive of motor 32 by means of motor 47 which drives ball nut 49 and picker arm 39 by contact therebetween at limit stop 51.

With vacuum assembly 40 in confronting engagement with case 26, vacuum is drawn along the extensible flow passage 44 so as to firmly secure the vacuum cups 41 to the face of case 26 thereby defining a shear plane therebetween.

Subsequently, case 26 is lifted preparatory to being moved onto tine member 38 by drawing upon cable 56 to lift vacuum assembly 40 substantially above the level of the end of tine member 38.

This action is accomplished simply by reverse driving of motor 47 to reversely move ball nut 49 into engagement with the rear limit stop portion 52. At this point, crank element 54 will have rotated counterclockwise something on the order of 120° by virtue of the fact that ball nut 49 will reversely rotate belt 58. Continued reverse rotation of drive motor 47 continues to urge ball nut 49 against rear limit stop portion 52 so as to disengage detent 59 from its pressure engagement beneath carriage body 53.

Figure 4:
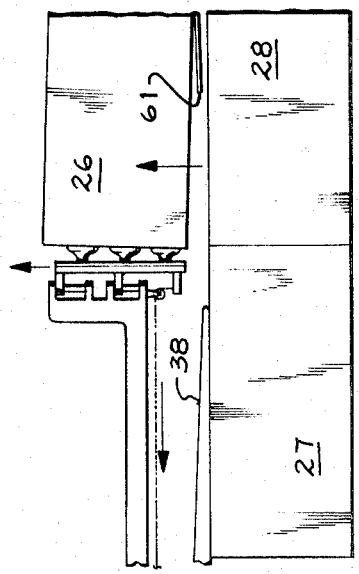
Figure 5:
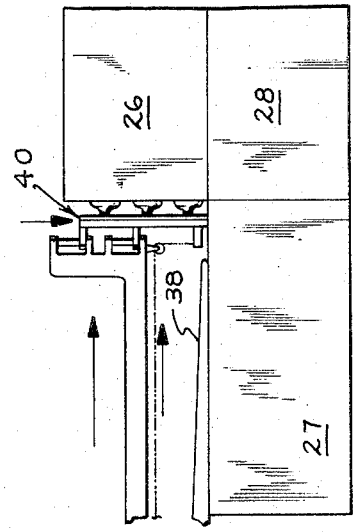

Accordingly, as shown best in FIG. 4, as the leading end of case 26 is lifted sufficiently clear of the end of tine member 38, any transversely extending drooping or sagging flap 61 will pass clear of the tine member 38 and be brought onto tine member 38 for further transport (FIG. 5).

As case 26 is drawn along tine member 38 with its leading portion elevated above the surface of member 38, it has been observed that notwithstanding the fact that case 26 may have been somewhat cocked at an angle with respect to vacuum assembly 40, the pivoting means formed by the hinged couplings 43 devices with the retracting movement so as to pivot the suction means 40 to a position substantially normal to the direction of the relatively retracting movements defined between member 38 and case 26.

However, where it is particularly desired to insure a true orientation of cases disposed upon the retrieving member 38, positive actuating means have been provided interposed between the end of picker arm 39 and the suction assembly 40 responsive to the relative movement of arm 39 with respect to the tine member 38 so as to positively pivot suction assembly 40 to a position substantially normal to the direction of the relatively retracting movement thereof along tine member 38.

Accordingly, tine member 38 includes an inclined upper surface along its length for engaging and progressively lifting follower elements such as rollers 62, 63 to progressively increase the degree to which a forwardly projectible portion (such as the elbow or knee 64, 65) protrudes forwardly, all as explained further below with respect to FIG. 12.

Suction assembly 40 comprises the support plate 42 carried at the end of a U-shaped flanged channel extension arm 67 and a suction manifold body plate 68 pivotally coupled thereto by means of the sliding hinges 69 secured to the back of body plate 68.

Hinges 69 are free to rise and fall on their respective support posts 71 so as to permit suction manifold body plate 68 to rise and fall and to pivot about an axis defined by posts 71 in closely spaced relation with respect to support plate 42.

Disposed at the sides of support plate 42 a pair of cam follower elements such as the rollers 62, 63 are carried respectively on the ends of elongate legs 72, 73 each of which is articulated at an upper portion to incorporate a hinged knee or elbow connection 64, 65 arranged to be urged forwardly as its associated roller 62, 63 travels upwardly along the inclined surface of tine member 38.

It is to be appreciated that in the event that manifold plate 68 should be cocked at a substantial angle with respect to the general plane of plate 42, followers 62, 63 will serve to cause one or the other of the two knees 64, 65 to engage and positively move or rotate plate 68 about the axis of rotation defined by posts 71.

Prior to retracting a case along tine member 38, the case will first be lifted as above described by tightening cable 56. Accordingly, cable 56 is trained about a pulley 74 and anchored in a small block 76 attached by suitable means to suction plate 68.

As shown best in the diagrams of FIGS. 13A, B and C, a case 26 is shown disposed at an angle with regard to the axis of arm 39 and, accordingly, the suction plate 68, after freely pivoting into confronting engagement with case 26 is disposed at a substantial angle to the plane of plate 42.

Initially, each of the followers or rollers 62, 63 is at its lowermost extended position and, accordingly, their respective knees protrude only slightly from the general axis of their legs 72, 73. However, as plate 42 is moved to the position shown in FIG. 13B, the knee 64 will be the first to strike the backside of plate 68 and thereby cause it to progressively pivot about post 71 as plate 42 is retracted. Ultimately, as shown in FIG. 13C knee 64 becomes fully projected as does knee 65 whereby both knees bear against the back surface of plate 68 to maintain its aligned orientation substantially normal to the direction of movement of vacuum head assembly 40.

A vacuum system has been provided whereby a suitable vacuum pump or other vacuum source (not shown) is coupled to the inlet line 77 (FIG. 7) which leads into manifold 46 connected to the open end of the first section 78 of telescopically extensible tubing formed with an interior air seal 79 at its outer end and between all pairs of tubes.

The right hand end of the extensible vacuum flow passage 44 is formed by the section of tubing 81 which leads (FIG. 12) into the rear side of plate 42 to a flow divider 82 serving to couple the vacuum via flexible hoses 83, 84 into manifolds 86, 87 covered by the face plate 88 sealing the manifolds. Manifolds 86, 87 are formed by milling or casting or otherwise forming depressions in plate 68 to leave a solid back cover on plate 68 to provide support and sealing.

Each manifold 86, 87 draws a vacuum through three flexible rubber vacuum cup assemblies 89.

When there are holes in the cardboard case being selected, it is possible that a vacuum cup will not seal properly because it overlaps all or part of a hole in the cardboard. In this situation, there would normally be excessive flow through one vacuum cup so as to cause a loss of vacuum among the cups of its related manifolds 86, 87. In order to prevent loss of vacuum in this circumstance, each vacuum cup assembly 89 may be adjusted to close automatically when an excessive amount of air is being pumped through it. The adjustment is determined so that some flow of air is permitted, such as is drawn through the porous cardboard but a desired differential pressure of approximately 10 lbs. is maintained between manifolds 86, 87 and the external atmospheric air pressure. All vacuum cups are adjusted to approximately the same flow rate to equalize the force generated on each cup by the differential pressure.

Compliant vacuum cup valve assemblies 85 are each adjusted to draw the same flow rate when disposed in engagement with the side of a cardboard box, case or the like. When out of engagement, they are arranged to close substantially completely. Accordingly, each valve assembly 85 is opened in response to masking off its associated compliant vacuum cup 89 from atmospheric pressure and is closed in response to exposure to atmospheric pressure in its unmasked condition, all as now to be described.

Face plate 88 covers manifolds 86, 87 in sealed relation but includes vacuum passages 90 leading to each assembly 85. An annular seat element 96, formed with a cylindrical mounting portion 96a extending axially through the body of cup 89 is mounted within passage 90 for supporting cup 89. Element 96 also includes a flanged mounting portion 96b formed at its inner circumference with a frusto-conical valve seat 96c.

A closure member 93 includes an elongate sleeve portion 93a coaxially movable within mounting portion 96a to define an annular flow passage therearound. Member 93 further includes a flanged closure head 93b formed with a tapered central seating surface 93c for engaging valve seat 96c. Closure member 93 moves along a screw 92 (engaged in opening 94) between advanced and retracted positions against the force of a spring 92 disposed on screw 91.

Operation of each suction assembly 85 proceeds as follows. The head of screw 91 is advanced to draw closure member 93 toward seat element 96 to form a constricted air passage therebetween.

With no vacuum applied to manifolds 86, 87 springs 91 will urge closure member 93 axially away from valve seat 96c. Upon application of vacuum of the order of 10 lbs. to each manifold 86, 87, the flow of air through the annular channel defined between closure member 93 and seat element 96 permits atmospheric pressure to act against flanged closure head 93b thereby substantially completely closing off the channel and valve. However, whenever a cup 89 is sealed against a case or box, the atmospheric pressure is masked from member 93 and the force of spring 91 opens the vacuum channel by moving closure member 93 axially outwardly so as to apply full vacuum to the side of a case or box or other article.

Thus, the amount of vacuum drawn at each of the cups is readily adjustable by means of the screws 91, springs 92 and movable closure members 93 which, upon tightening of screws 91 into their respective openings 94, serves to increase or decrease the amount of clearance between the seat 96 and member 93.

As shown in FIG. 12, at the sides of plate 68, a pair of microswitch housings 97 are disposed for purposes of mounting electrosensitive feelers (not shown) so as to provide a means for detecting proximity to a case or other article to be retrieved.

Having the foregoing arrangement in mind, the detailed construction as shown best in FIGS. 7 and 9 can readily be described. In order to assist in relating portions previously described with respect to the other figures herein, corresponding portions found in FIGS. 7 and 9 will be identified by the same numbers as before but with a third order digit "0". For example, in FIG. 1 drive motor 32 has been shown whereas in FIG. 7, drive motor 032 is indicated for substantially the same function. Similarly, drive motor 47 shown in FIG. 2 is shown in FIG. 7 as motor 047. Suction cups 089 are also indicated as related to suction cups 89 shown in FIG. 12.

Section 21 (FIG. 1) consists of the box construction 021 including a ball screw 029 and a ball nut 031 movable therealong. Drive motor 032, by means of the belt drive 98, rotates ball screw 029 in one or the other of two directions.

Accordingly, ball screw 031 attached to the top plate 99 of section 022 serves to advance section 022. Opposite side edge margins of top plate 99 are disposed to ride between two pairs of closely spaced guide rollers 101 located on both sides of section 021 to protrude inwardly from the side wall thereof.

The connections 36, 37 with respect to belt 33 (FIG. 1) are made at points 036, 037, respectively with regard to cable 033.

Accordingly, cable 033 is trained about a pair of pulleys 034 at each end of section 022. Further, sections (not shown) of the extensible vacuum flow column 44 are disposed coaxially along section 022 such as at 044.

In addition, the bottom plate 102 of section 022 includes guide rollers 105 cooperating to roll along and between the guide ribs 103 formed on the top surface of section 023. The trailing end of section 023 is supported by means of its guide rollers 104 carried by the raised side wall portions 106a, 106b engaging bottom plate 102 of section 022 on both the top and bottom outer side marginal surfaces thereof.

The bottom flange 67a of extension arm 67 slides in rolling engagement with support rollers 112 carried by the inner side walls of section 023.

Referring to FIG. 7, section 023 is advanced by the connection made at clamp 037 attached to the inner side wall of portion 106a. Thus, motor 032 serves to extend sections 022 and 023 simultaneously at a rapid rate from section 021 by means comparable to that shown in FIG. 1.

Means comparable to that shown in FIG. 2 for controlling picker arm 39 shown therein comprises the channel extension arm 67 described earlier above and formed with a flanged bottom or base surface 67a. A cable 56 lies within the channel extension arm 67 and extends rearwardly to the crank element 054 formed with an upper and lower sheave portion oriented in a horizontal plane. Cable 058 (FIG. 10) includes a "bottom" and "top" reach thereof respectively designated 058a and 058b (as shown in the plan view of FIG. 10). Slots 107 are formed in the sides of channel arm 67 to accommodate the rotation of crank element 054.

A ball nut 049 is mounted for movement along the ball screw 048 driven by motor 047. Ball nut 049 carries a cable clamp portion or element 049a fixed thereto and clamped to cable reach 058a.

Reach 058a of cable 058 as shown in FIGS. 9 and 10 is wrapped approximately one complete revolution about crank element 154 and anchored at point 108. On the other hand, the upper reach 058b of cable 058 as shown is substantially entirely unwound and anchored at point 110. The anchoring is achieved simply by disposing the ends of cable 058 radially into slots or notches formed in crank element 054 and then securing them by means of a screw such as 109 tightened against the inserted ends.

From the foregoing, it will be readily evident that there has been provided an improved article handling arm assembly suitable for automated retrieval of cased goods disposed on pallets or the like whereby each case is individually retrieved by attachment at the shear plane defined between a suction head and a face of the case. The system described overcomes the problems caused by a sagging bottom flap formed on most cardboard cases and also serves to straighten each case retrieved in a manner so that it will be squarely oriented when delivered to its destination.

We claim:

1. In a machine of the kind described for handling articles, the combination of an elongate, rigid tine member, means for moving said tine member to a position adjacent one of said articles, a movable picker arm, suction means carried at the end of said arm to move therewith, means for advancing said arm and suction means from a retracted to an advanced position to dispose the suction means adjacent the end of said tine member and into confronting engagement with an article, means for adhering said suction means to said article in an upwardly disposed shear plane at the interface defined therebetween, means for lifting said suction means to lift said article relative to said tine member via said shear plane, and means relatively moving said arm with respect to said tine member to dispose said tine member at least partly beneath said article.

2. In a machine of the kind described according to claim 1 further comprising pivot means coupling said suction means to said arm to permit said suction means to freely pivot so as to become disposed in aligned confronting relation with articles disposed at various angles thereto, the last named means serving to permit said relative movement of said arm with respect to said tine member to dispose said suction means to a position substantially normal to the direction of the relatively advancing and retracting movement thereof along said tine member.

3. In a machine of the kind described according to claim 1 further comprising pivot means coupling said suction means to said arm to permit said suction means to freely pivot about an upright axis so as to become disposed in aligned confronting relation with articles disposed at various angles, and positive acting means interposed between said arm and said suction means responsive to said relative movement of said arm with respect to said tine member to positively pivot said suction means to a position substantially normal to the direction of the relatively advancing and retracting movement thereof along said tine member.

4. In a machine of the kind described according to claim 3 wherein said positive acting means comprises a mounting member fixed relative to said arm and disposed transversely of said direction to be carried at the outer end of said arm, a pair of elongate leg assemblies carried by said fixed member to depend downwardly in spaced relation from each other on opposite sides of said arm, each of said leg assemblies including a follower element at the distal end thereof to engage said tine, guide means confining the movement of said follower element substantially to reciprocation thereof, and means in each of said assemblies serving to project a portion thereof to protrude forwardly of said mounting member upon engagement of said follower element with said tine, said suction means including a support body coupled to said pivot means to swing forwardly and rearwardly respectively on opposite sides of said arm, said body being disposed to be engaged by said projectible portions to move said suction means into a predetermined plane extending transversely of said direction.

5. In a machine of the kind described for retrieving articles from storage, an elongate tine member for carrying said articles, a movable picker arm movable between retracted and advanced positions along said tine member in a predetermined direction and the reverse thereof, carriage means fixed relative to said arm on opposite sides thereof, elongate leg assemblies carried by said carriage means to depend downwardly in spaced apart relation from each other on opposite sides of said arm, each of said leg assemblies including a follower element at the distal end thereof to engage said tine, and means in each said leg assembly serving to project a portion thereof to protrude forwardly of said fixed carriage means upon engagement of said follower element with said tine, and suction means including a support body pivotally coupled to said arm to swing forwardly and rearwardly respectively on opposite sides of said arm, said body being disposed to be engaged by said projectible portions to move said suction means into a predetermined plane extending transversely of said direction.

6. In a machine for handling articles according to claim 5 wherein said tine member includes an inclined surface along its length for engaging and progressively lifting said follower elements to progressively increase the degree to which said projectible portions protrude.

7. In a machine for handling articles according to claim 1 comprising means operable after advancing said suction means serving to preclude relative retraction movement of said arm with respect to said tine member without first having lifted said suction means to a predetermined position serving to dispose a leading portion of the article above the level of said tine member.

8. In a machine of the kind described for handling articles, the combination of an elongate, rigid tine member, means disposing said tine member at a position adjacent one of said articles, a movable picker arm, suction means carried at the end of said arm to move therewith, drive means for positively advancing said arm and suction means from a retracted to an advanced position to dispose said suction means at the end of said tine member and into confronting engagement with an article, means for adhering said suction means to said article in an upwardly disposed shear plane at the interface defined therebetween, the penultimate named means serving to first lift said suction means to displace an adjacent portion of the adhered article above the level of said tine member and then serving to retract said suction means along said tine member to draw said article at least partly onto said tine member.

9. In a machine for handling articles according to claim 8 wherein said penultimate named means comprises detent means interengaging portions of said arm and tine member to temporarily hold one from moving relative to the other, sliding mountings supporting said suction means from said arm to be free to rise and fall with respect to said tine member, a pulley at the end of said arm, a flexible cable coupled at one end to said suction means via said pulley, limited displacement means coupled to the other end of said cable and movable through a predetermined displacement between advanced and retracted positions to lower and lift said suction means, and means coupling said drive means to said limited displacement means to drive same throughout said predetermined displacement while said detent means retains the interengagement between portions of said arm and tine members, and thereafter upon release of said detent means, serves to engage and move said arm therewith to retract said arm with respect to said tine member.

10. In a machine for handling articles according to claim 1 wherein said suction means comprises a source of vacuum, manifold means coupled to said source, suction cup means in gas communication with said manifold means, said suction cup means including a compliant cup-shaped element, and air valve means carried within said element, said air valve means including a closure member and a seat element cooperating therewith and further including means responsive to masking said closure member and seat element from atmospheric pressure serving to open the valve and responsive to exposure of said closure member and seat element serving to close said valve means.

11. In a machine for handling articles according to claim 10 further comprising a plurality of said suction cup means each including means for individually adjusting its own flow rate.

* * * * *